Mar. 6, 1923. 1,447,253

A. LA FON

CLAMPING COLLAR

Filed Mar. 10, 1920

INVENTOR

Alphonse La Fon

By Attorneys,

Fraser Turk & Myers

Patented Mar. 6, 1923.

1,447,253

UNITED STATES PATENT OFFICE.

ALPHONSE LA FON, OF SEWAREN, NEW JERSEY.

CLAMPING COLLAR.

Application filed March 10, 1920. Serial No. 364,683.

*To all whom it may concern:*

Be it known that I, ALPHONSE LA FON, a citizen of the United States of America, residing in Sewaren, in the county of Middlesex and State of New Jersey, have invented certain new and useful Improvements in Clamping Collars, of which the following is a specification.

This invention relates to clamping collars for use on rods, and aims to provide improvements therein.

The present invention provides a clamping collar which is simple in construction, which may be readily manufactured, and which may be firmly and securely attached to a rod, and which hence provides a reliable clamping collar in use. The invention further provides a clamping collar which is durable, especially under conditions of outdoor use, where the device is used in conjunction with rods and structures for the manufacture of concrete structures.

Other features of improvement will be hereinafter set forth.

An embodiment of the invention is illustrated in the accompanying drawings.

In said drawings.

Figure 1:
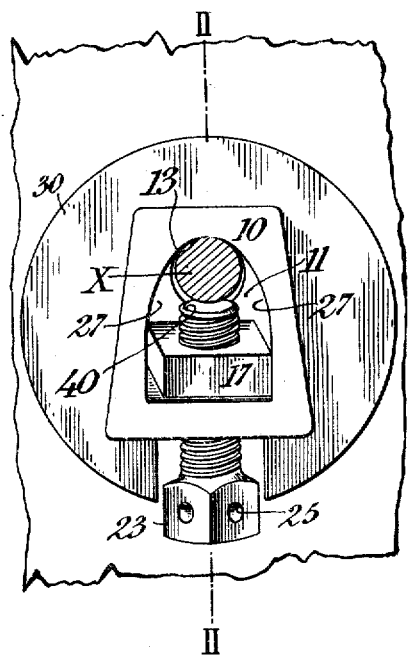
Figure 1 is a top plan view of the clamp shown applied to a rod.
Figure 2:
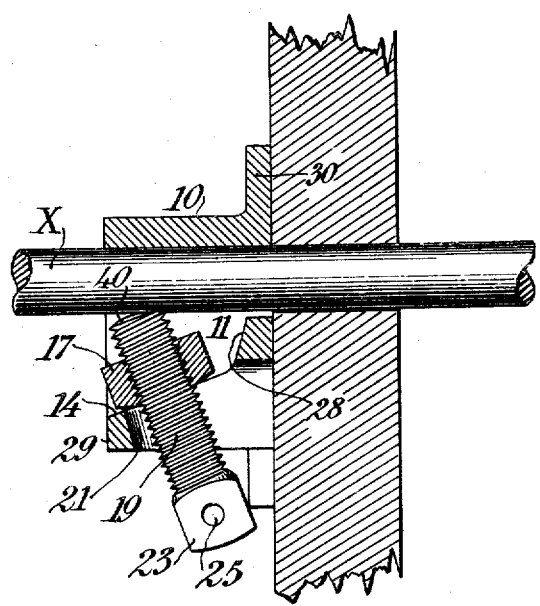
Fig. 2 is a cross section on the line II—II, Fig. 1.
Figure 3:
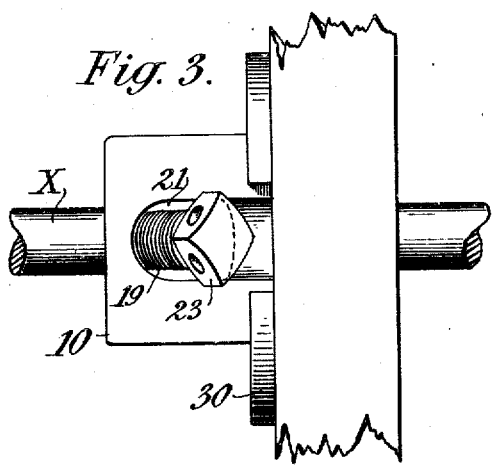
Fig. 3 is a view of the device in side elevation.

Referring to said drawings, numeral 10 designates the collar, having a recess or opening 11 therethrough, for the passage of a rod X. The inner wall of said collar facing said recess has a portion 13 which conforms generally to the size and shape of the rod with which the clamp is to be used. Opposite the portion 13 of the inner wall of the collar there is an inclined wall 14, said wall being inclined in the direction of the axis of the said rod opening 11.
Numeral 17 designates a nut or the like, preferably a common square nut, and numeral 19 designates a bolt or the like, adapted to project from said nut into contact with the side of a rod running through said rod opening in the collar. The part 19 is preferably an ordinary screw-threaded bolt, which extends through the nut 17, and through an opening 21, preferably elongated, running through to the outer side of the collar. The bolt 19 is conveniently provided with a head 23, having a plurality of holes 25 therethrough, through which a nail, or the like, may be passed, and used as a lever for turning the bolt in the nut, and forcing the bolt against the side of the rod.
In the case of smaller sized rods, the parts 27 of the inner walls of the collar facing the opening 11, between the part 13 of the wall and the inclined part 14, are preferably formed as somewhat diverging from the middle plane of the recess, so that the recess or opening 11 is somewhat broader toward the inclined wall 14, thereby readily accommodating the nut. The side parts 27 of the inner wall, however, should be close enough to confine the nut 17 and prevent it from turning.

The inner wall of the collar, adjacent the bottom of the inclined wall 14 is preferably provided with a shoulder 28, which acts to limit the downward movement of the nut, when the collar is not in place on the rod. A portion 29 of the collar, may limit the outward movement of the nut by coming in contact with the bolt 19 thereon.

The bottom face of the collar is preferably provided with a flange 30 which is adapted to increase the area with which the collar bears against the part to be clamped.

The bolt is preferably provided with a circular edge 40, at its end, which is adapted to bite into the rod.

The operation and use of the device is as follows: The collar is slipped over the end of a rod X. This rod may be a tie-rod connecting the two boards forming the sides of a mold in which concrete is being poured to form a wall, for example. The collar is slipped along the rod until it comes against the board to be clamped and an implement for forcing the collar against the board to be clamped may be used if desired. If the end of the bolt is in contact with the rod, the collar is prevented from slipping back on the rod by reason of the fact that the edge 40 bites the rod and causes the bolt 19 to rock toward the rod, pressing it against the inner face 13 of the collar, the bolt being supported through the nut, upon the inclined face 14 of the collar. Preferably, the end of the bolt is made to project but slightly in from the face of the nut, so that the collar may be slipped upon the rod without requiring the exercise of any special care. As the end of the bolt comes in contact with the rod, the nut and bolt may slip slightly outward along the inclined face 14 and thereby allow more space for the collar to slip along the rod. After the collar is in place, the bolt may be caused to bite against the rod by screwing the bolt 19 in the nut 17 until it presses the rod X firmly against the inner face portion 13. The rod cannot then slip, owing to the fact that any movement of the collar on the rod causes the end of the bolt 19 to be pressed with greater force into and against the rod X.

In case the screw-threads on the bolt rust, or become stripped, a new bolt may be inserted, the remaining parts being usable. If the threads upon the nut become stripped or worn, the nut may be replaced without having to renew either the bolt or the collar.

The inventive ideas herein set forth may receive other embodiments or mechanical expressions than that herein specifically illustrated and described.

What I claim is:

1. A clamping collar for use on rods, said collar having an opening running therethrough for the passage of a rod, and a face inclined to the axis of said rod opening, a nut adapted to bear against said inclined face, and a bolt projecting from said nut at an incline to a rod in said opening which it is adapted to bite.

2. A clamping collar for use on rods, said collar having an opening running therethrough for the passage of a rod, and a face inclined to the axis of said rod opening, a nut adapted to bear against said inclined face, and a bolt projecting from said nut at an incline to a rod in said opening which it is adapted to bite, said bolt and nut having interengaging screw-threads whereby the said bolt may be advanced and tightened against said rod.

3. A clamping collar for use on rods, said collar having an opening running therethrough for the passage of a rod, and a face inclined to the axis of said rod opening, a nut adapted to bear against said inclined face, and a bolt projecting from said nut at an incline to a rod in said opening which it is adapted to bite, said bolt extending through said nut and through said collar, said bolt and nut having interengaging screw-threads, and said collar having an opening through one side for the passage of said bolt.

4. A clamping collar for use on rods, said collar having an opening running therethrough for the passage of a rod, and a face inclined to the axis of said rod opening, a nut adapted to bear against said inclined face, and a bolt projecting from said nut at an incline to a rod in said opening which it is adapted to bite, said collar having a shoulder at the bottom of said inclined face for limiting the movement along said face of said nut.

5. A clamping collar for use on rods, said collar having an opening running therethrough for the passage of a rod, and a face inclined to the axis of said rod opening, a nut adapted to bear against said inclined face, and a bolt projecting from said nut at an incline to a rod in said opening which it is adapted to bite, said bolt extending through said nut and through said collar, said bolt and nut having interengaging screw-threads, and said collar having an opening through one side for the passage of said bolt, said opening being elongated to admit of movement of said nut along said inclined face.

6. A clamping collar for use on rods, said collar having an opening running therethrough for the passage of a rod, and a face inclined to the axis of said rod opening, a nut adapted to bear against said inclined face, and a bolt projecting from said nut at an incline to a rod in said opening which it is adapted to bite, the inclination of said bolt being toward the bearing face of said collar.

7. A clamping collar for use on rods, said collar having a base adapted to bear against a concrete form and an opening therethrough for the passage of a rod, and a fastening piece having a bearing on said collar and being adapted to make a contact with a rod in said opening, said fastening piece and bearing being so arranged that a pull on said rod will cause said clamping piece to swing on its bearing toward said rod to press it against said collar, said bearing on said collar being so formed as to permit said fastening means to rock thereon.

8. A clamping collar for use on rods, said collar having a base adapted to bear against a concrete form and an opening therethrough for the passage of a rod, and a fastening piece having a bearing on said collar and adapted to make contact with a rod in said opening, said fastening piece and bearing being so arranged that a pull on said rod will cause said clamping piece to swing on its bearing toward said rod to press it against said collar, said bearing on said collar being so formed as to permit said fastening means to rock thereon, said fastening piece having a sharp edge adapted to bite into said rod.

9. A clamping collar for use on rods, said collar having a base adapted to bear against a concrete form and an opening therethrough for the passage of a rod, and a fastening piece having a bearing on said collar and adapted to make contact with a rod in said opening, said fastening piece and bearing being so arranged that a pull on said rod will cause said clamping piece to swing on its bearing toward said rod to press it against said collar, said bearing on said collar being so formed as to permit said fastening means to rock thereon, the fastening piece having a tool engaging portion by which it may be forced against a rod.

10. A clamping collar for use on rods, said collar having a base adapted to bear against a concrete form and an opening therethrough for the passage of a rod, and a fastening piece having a bearing on said collar and adapted to make contact with a rod in said opening, said fastening piece and bearing being so arranged that a pull on said rod will cause said clamping piece to swing on its bearing toward said rod to press it against said collar, said bearing on said collar being so formed as to permit said fastening means to rock thereon, said fastening piece having a sharp edge adapted to bite into said rod, said fastening piece having a tool engaging portion by which it may be forced against a rod.

11. A clamping collar for use on rods, said collar having an opening therethrough for the passage of a rod, and a fastening piece having a bearing on said collar and on a rod in said opening, said fastening piece and bearing being so arranged that a pull on said rod will cause said clamping piece to move toward said rod to press it against said collar, said fastening piece comprising a bolt bearing against said rod having a shoulder bearing on said collar.

12. A clamping collar for use on rods, said collar having an opening therethrough for the passage of a rod, and a fastening piece having a bearing on said collar and on a rod in said opening, said fastening piece and bearing being so arranged that a pull on said rod will cause said clamping piece to move toward said rod to press it against said collar, said fastening piece comprising a bolt bearing against said rod and having a shoulder bearing on said collar, said shoulder being a nut in which said bolt is threaded.

13. A clamping collar for use on rods, said collar having an opening therethrough for the passage of a rod, and a fastening piece having a bearing on said collar and on a rod in said opening, said fastening piece and bearing being so arranged that a pull on said rod will cause said clamping piece to move toward said rod to press it against said collar, said fastening piece comprising a bolt bearing against said rod and having a shoulder bearing on said collar, said collar having an inclined shoulder against which said bolt shoulder bears.

14. A clamping collar for use on rods, said collar having an opening therethrough for the passage of a rod, and a fastening piece having a bearing on said collar and on a rod in said opening, said fastening piece and bearing being so arranged that a pull on said rod will cause said clamping piece to move toward said rod to press it against said collar, said fastening piece comprising a bolt bearing against said rod and having a shoulder bearing on said collar, said collar having an inclined shoulder against which said bolt shoulder bears, said collar shoulder being inclined toward the bearing face of said collar, whereby the inclination of said bolt is away from said bearing face.

In witness whereof, I have hereunto signed my name.

ALPHONSE LA FON.